Nov. 13, 1962     E. H. DINGER     3,064,174
MOTOR SPEED CONTROL CIRCUITS
Filed May 18, 1961     2 Sheets-Sheet 1
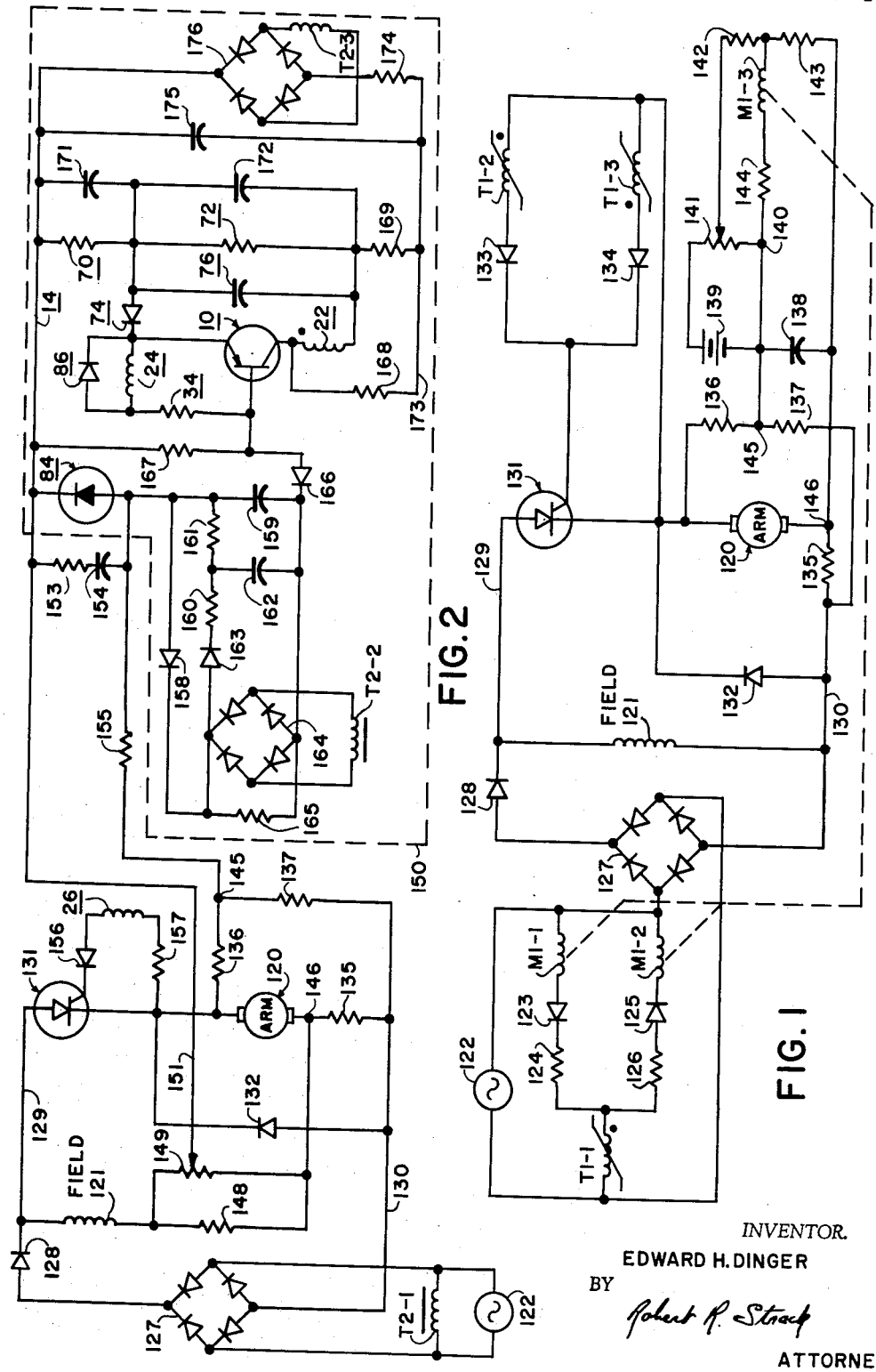
INVENTOR.
EDWARD H. DINGER
BY Robert R. Strack
ATTORNEY Nov. 13, 1962

E. H. DINGER 3,064,174

MOTOR SPEED CONTROL CIRCUITS

Filed May 18, 1961

INVENTOR.
EDWARD H. DINGER
BY
Robert R. Strack
ATTORNEY

United States Patent Office 3,064,174
Patented Nov. 13, 1962

3,064,174
MOTOR SPEED CONTROL CIRCUITS
Edward H. Dinger, Waynesboro, Va., assignor to General
Electric Company, a corporation of New York
Filed May 18, 1961, Ser. No. 111,067
9 Claims. (Cl. 318—331)

This invention relates to the automatic speed control of direct current motors, and particularly, to speed control of direct current motors by controlling the armature voltage applied thereto.

The speed of a direct current motor is a function of the armature voltage and the voltage drop caused by current flow through the armature resistance. A common means of speed control in such a motor is to keep the field constant and provide means for automatically varying the armature supply so as to supply the voltage and current required in order to maintain the speed constant as the load varies. One technique for accomplishing this includes developing a feedback loop wherein voltages corresponding to the armature terminal voltage and the armature resistance drop are compared with a reference voltage and the difference therebetween applied to a gating device which controls the voltage applied to the armature.

An object of the invention is to provide improved circuits for speed control of direct current motors operating from alternating current lines and employing armature voltage feedback control.

In the past, the gating devices employed for applying armature voltage often took the form of a pair of thyratrons connected in series with the armature and arranged to full-wave rectify an applied alternating current. The rectified voltage was applied to the armature during the conduction period of the thyratrons which was controlled in accordance with the armature voltage and current. By applying a triggering voltage to the thyratrons at various phase angles with respect to the initiation of each half cycle of the alternating current it was possible to control the amount of voltage applied to the armature during any half cycle of the alternating current supplied.

Semiconductor electronics offer gating means having many electrical characteristics of the thyratorn type devices with the advantages of light weight, great power gain, high efficiency, long life, no required warm-up time, and no required filament power. In particular, silicon controlled rectifiers exhibit these advantageous features and also require extremely short periods of time to assume a nonconducting state after a period of conduction. For example, a silicon controlled rectifier may be rendered nonconductive and subsequently nonresponsive to positive voltages applied between its anode and cathode within a matter of approximately 20 microseconds, whereas a thyratron requires a period of time in the order of 1000 microseconds in order to deionize and be nonresponsive to a forward bias between its anode and cathode. This fast turn-off characteristic of the silicon controlled rectifier permits its employment in circuits having a longer allowable conduction period per cycle than was previously possible with thryratron-type devices. In single phase controlled rectifier circuits employing thyratrons, it is common practice to use one thyratron for controlling the output during the positive half cycle of the single phase supply voltage and another thyratron for controlling the output during the negative half cycle. This practice allots to each thyratron one complete half cycle (while the other thyratron is controlling the output) to resume its nonconducting state. The fast turn-off characteristic of the silicon controlled rectifier makes feasible the use of a single rectifier for controlling the output during both positive and negative half cycles of the supply voltage.

Another object of the invention is to provide improved motor speed control circuits designed for rapid response to changes in load conditions and employing pulse generating means responsive to motor voltage and current to control the conduction period of gating means serially connected with the motor armature.

In accordance with the invention, a single silicon controlled rectifier is serially connected with the armature of a direct current motor across a full-wave rectified unfiltered source of alternating voltage. Three embodiments disclose distinct pulse generating circuits responsive to the difference between a reference voltage and the combination of armature voltage and armature resistance drop to generate pulses for gating the controlled rectifier to a conducting state. The instant of application of each gating pulse is determined by the magnitude of the difference voltage developed.

A feature of the invention resides in means for employing a single controlled rectifier for a complete cycle of application of unfiltered, full-wave rectified alternating current to the armature of a direct current motor.

Another feature of the invention relates to means for enabling the gate electrode of the controlled rectifier to regain control. Circuitry, including the motor field winding, is included for automatically momentarily reverse-biasing the rectifier each half cycle of voltage applied.

The novel features of the invention are set forth with particularity in the appended claims. The invention itself, however, both as to its organization and method of operation, together with further objects and features thereof, may best be understood by reference to the following description taken in conjunction with the accompanying drawing wherein:

FIG. 1 is a circuit schematic of an embodiment of the invention using a magnetic amplifier and saturable core transformer to develop gating pulses for selective control of a silicon controlled rectifier in series with the armature of a direct current motor;

FIG. 2 is a circuit schematic of an embodiment of the invention using a transistor pulse generating circuit to develop gating pulses for selective control of a silicon controlled rectifier in series with the armature of a direct current motor.

Figure 3:
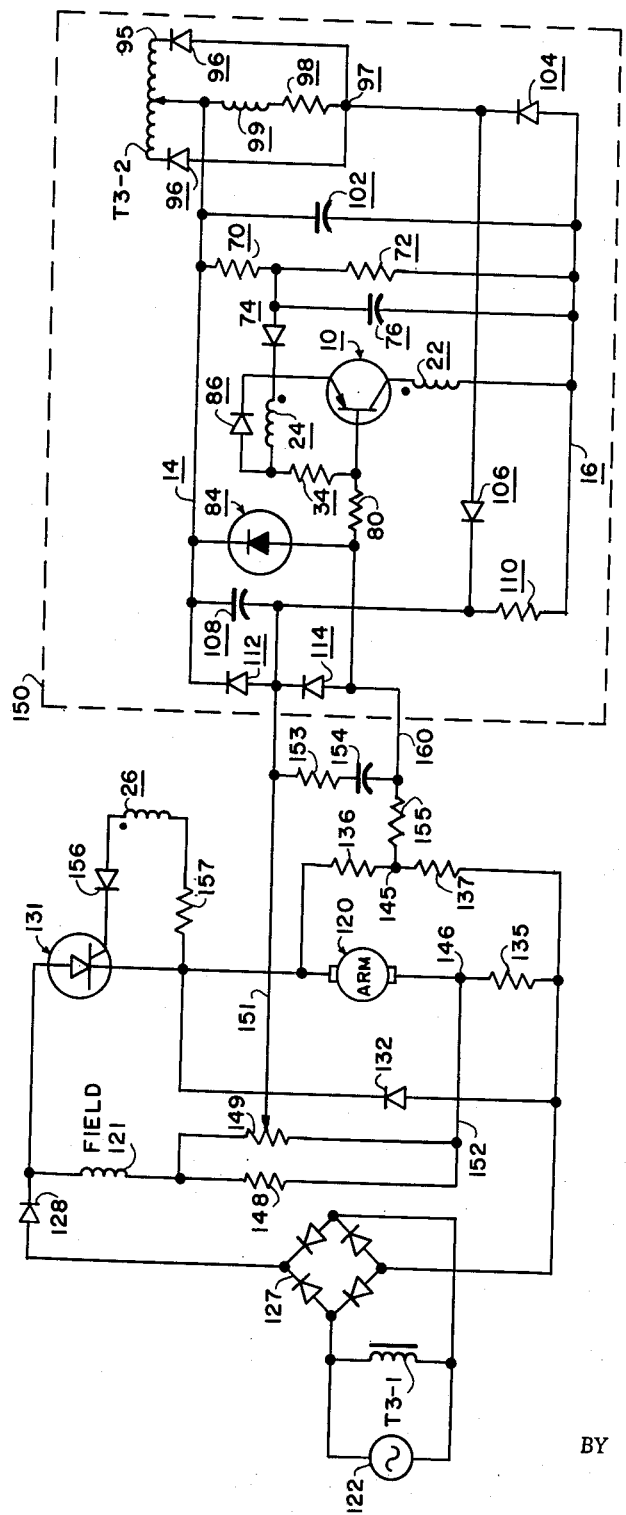
FIG. 3 is a circuit schematic of a modification of the circuit illustrated in FIG. 2 wherein a different pulse generating circuit is employed.

FIG. 1 illustrates an embodiment of the invention wherein a magnetic amplifier M1, in conjunction with a saturating transformer T1, is employed to control the voltage applied to the armature 120 of a direct current motor having a field winding 121. In this embodiment, an unfiltered full-wave rectified voltage derived from alternating current source 122 through rectifier 127 is continuously applied across field winding 121 of the direct current motor and across a series circuit comprising the armature 120 and a normally nonconducting controlled rectifier 131. Controlled rectifier 131 is enabled, i.e., rendered conducting, during each pulse of rectified voltage for a period of time determined by the difference between actual motor speed and desired motor speed. As described hereinafter, enablement of controlled rectifier 131 is under the control of magnetic amplifier M1 which saturates in accordance with the motor speed deviation and energizes transformer T1 to apply gating pulses to controlled rectifier 131.

Control winding M1—3 of the magnetic amplifier is arranged to be energized by a control voltage representing the difference between a reference voltage and a voltage representing motor back E.M.F., this voltage consisting of the armature voltage minus armature resistance drop. In accordance with conventional magnetic amplifier operation, after elapse of a period of time determined by the magnitude of the control voltage, the magnitude of alternating current source 122, and the volt-seconds characteristic of the magnetic amplifier, gate winding M1—1 or M1—2 thereof delivers a current pulse to the primary T1—1 of saturable transformer T1. The secondary windings T1—2 and T1—3 of saturable transformer T1 thereupon apply pulses which gate controlled rectifier 131 into conduction. Since controlled rectifier 131 is serially connected between the rectified output of rectifier 127 and armature 120 of the direct current motor, voltage is selectively applied to armature 120 and thus the motor speed is controlled in accordance with the above-described control voltage.

Armature 120 of the direct current motor has voltage applied thereto for a portion of each half cycle of current from alternating current source 122. During the positive half cycle of current from altenating current source 122 a current path exists through magnetic amplifier gate winding M1—1, rectifier 123, resistance 124, and primary winding T1—1 of saturating transformer T1. Because magnetic amplifier M1 is initially in a non-saturating state, the impedance of gate winding M1—1 will render the current flow in the above-described circuit minimal. Upon saturation of the magnetic amplifier core at a time determined by the control voltage on winding M1—3, a sharp, well-defined current pulse is delivered through gate winding M1—1 to the dotted terminal of transformer primary T1—1. In accordance with conventional "dot" notation, the current pulse in primary winding T1—1 induces voltages in secondary windings T1—2 and T1—3 which are positive at the dotted terminal thereof. Due to the orientation of rectifiers 133 and 134 the voltage induced in secondary winding T1—3 only is applied to the gate electrode of controlled rectifier 131. Secondary winding T1—3 applies a positive gating impulse in the circuit comprising conventional rectifier 134, and the gate and cathode electrodes of controlled rectifier 131. It is characteristic of silicon controlled rectifiers that once gated into a current conducting state they conduct continuously subject only to the external potential between anode and cathode electrodes and not to further variations in gate potential. Consequently, controlled rectifier 131 remains in conduction as long as a forward biasing voltage is impressed between the anode and cathode thereof.

In the instant circuit, controlled rectifier 131 is, except for a small amount of time at the end of each half cycle, continuously forward-biased by connection to the output of full-wave rectifier 127 which supplies a positive polarized, pulsating direct current to the anode thereof. The alternating current applied to gate windings M1—1 and M1—2 of magnetic amplifier M1 is simultaneously applied to full-wave rectifying bridge 127 and the positive terminal of bridge 127 is applied via rectifier 128 to conductor 129 which is connected to the anode of controlled rectifier 131. The negative terminal of rectifying bridge 127 is connected to conductor 130 and the voltage thereon is applied through a small series resistance 135 and armature 120 to the cathode of controlled rectifier 131. It is thus apparent that during the positive half cycle of current from source 122 the voltage applied to armature 120, and hence the speed of the motor, is determined by the instant at which controlled rectifier 131 is rendered conductive.

When the negative half cycle of current is applied, circuitry similar to that hereinbefore described, delivers a gating pulse to rectifier 131 that is also time-positioned in accordance with the speed of the motor. The circuit elements operative to deliver the gating pulse during a negative half cycle include: gate winding M1—2, rectifier 125, resistor 126, primary winding T1—1, secondary winding T1—2, and rectifier 133. By means described hereinafter, controlled rectifier 131 is momentarily reverse-biased at the end of each half cycle. Thus, during each cycle of current from source 122 an unfiltered full-wave rectified voltage from rectifier 127 is twice applied to armature 120, each time for a period automatically determined to maintain the motor speed constant.

The control voltage for maintaining the motor speed constant is obtained by comparing the armature terminal voltage and armature resistance voltage drop with a reference, illustrated in FIG. 1 as direct current source 139. While controlled rectifier 131 is enabled, current flows from conductor 129 through controlled rectifier 131, armature 120, and a small series resistor 135 to conductor 130. Because this current is the armature current, the voltage drop across resistor 135 is directly proportional to the armature resistance voltage drop. Resistors 136 and 137 form a voltage divider across armature 120 and thus provide a voltage at point 145 which is proportional to the terminal voltage of armature 120. The voltage between points 145 and 146 is thus proportional to the armature voltage minus the armature resistance drop and this quantity is directly proportional to the speed of the D.C. motor of which armature 120 is a part. By comparing the voltage between terminals 145 and 146 with standard voltage 139, the deviation of the present motor speed from the desired motor speed may be obtained.

In FIG. 1 the derivation of a control voltage from a comparison of the voltage between points 145 and 146 and standard reference voltage 139 is accomplished by means of a bridge circuit having the control winding M1—3 connected between opposite diagonals thereof. The bridge circuit comprises: capacitor 138, across which the voltage between points 145 and 146 is applied; potentiometer 141, which adjusts standard voltage 139 to yield a reference voltage representing the speed desired; and fixed resistors 142 and 143. When the ratio of the voltage between points 146 and 145 (which represents present motor speed) to the voltage between point 149 and the slider on potentiometer 141 is greater than the ratio of resistor 143 to resistor 142, current flows in the circuit comprising point 145, resistor 144, control winding M1—3, resistor 143, and point 146. When the ratio of the reference voltage between point 140 and the slider on potentiometer 141 to the voltage between points 146 and 145 is greater than the ratio of resistor 142 to 143, current flows in the circuit comprising the positive terminal of source 139, a portion of potentiometer 141, resistor 142, control winding M1—3, resistor 144, and the negative terminal of source 139. It will be noted that the above traced current paths produce current in opposite directions through control winding M1—3. The magnitude of the current flow, and its direction, are indicative of the deviation between present motor speed and desired motor speed. The magnitude and direction of current flow in control winding M1—3 determines at what time a current pulse is produced by gate winding M1—1 or M1—2 and subsequently, when a gating pulse is applied to controlled rectifier 131. Thus the instant of pulse application is automatically adjusted to maintain a constant motor speed.

In typical operation, the slider on potentiometer 141 is adjusted to produce between the slider and point 140 a voltage representative of the desired speed. This voltage less the voltage developed across points 145 and 146 will cause a current flow through control winding M1—3 which establishes the correct delay in delivery of a current pulse through gate winding M1—1 or M1—2 of the magnetic amplifier to maintain the desired motor speed. Upon a small decrease in motor speed the voltage between points 145 and 146 decreases, causing current flow through control winding M1—3 in a direction which initially polarizes the core of magnetic amplifier M1 to require a shorter period of application of voltage to gate winding M1—1 or M1—2 before saturation occurs and a current pulse is delivered to primary T1—1 of the saturating transformer T1. Under these conditions, controlled rectifier 131 is enabled earlier in each half cycle and voltage is applied to armature 120 for a longer period of time in order to increase the motor speed. An increase in motor speed above the desired amount has the converse effect upon current in control winding M1—3 with the result of adjusting the speed downward until the desired value is reached.

The above description has shown that the instant at which controlled rectifier 131 begins conduction is controlled directly by the motor speed. It is characteristic of a controlled rertifier that onec gated into conduction it will continue conducting until a reverse voltage is applied between its anode and cathode terminal and that further variations in voltage upon the gate electrode will have no effect on its conduction state. An important feature of the circuit in FIG. 1 is the provision of means for utilizing the reactive effect of shunt field winding 121 at the end of each half cycle of the alternating current from source 122 to create a reverse-bias across controlled rectifier 131 and switch it to a nonconducting state until re-switched into conduction in the subsequent half cycle by application of a gating pulse at a time determined by the speed of the motor. The elements involved in the turn-off of controlled rectifier 131 include rectifier 128, field winding 121, bridge rectifier 127, and rectifier 132.

The output of bridge rectifier 127 is a full-wave rectified voltage. Due to the inductive effects of field winding 121 the current caused by the rectified voltage lags the voltage and consequently, at the end of each half cycle when the voltage tends to zero the current continues to flow through rectifier 128. When the supply voltage from bridge rectifier 127 is zero, there is a potential difference between conductors 129 and 130 which is equal to the forward voltage drop across the two conducting rectifiers in bridge rectifier 127 and rectifier 128 in series. Current flow through armature 120 of the direct current motor causes a negative voltage on the cathode of controlled rectifier 131 which is limited by the forward voltage drop across rectifier 132. Consequently, the voltage on conductor 129 is negative with respect to that on the cathode of controlled rectifier 131 by approximately the voltage drop across two rectifiers. This negative voltage is effective to render controlled rectifier 131 nonconducting. The duration of time that controlled rectifier 131 is subjected to this reverse-bias depends upon the magnitude of alternating current source 122. For purposes of illustration, it may be noted that with a 115 volt alternating current supply, the duration of time is approximately 30 microsceonds. This is ample to enable the controlled rectifier 131 to regain its blocking characteristics.

FIGS. 2 and 3 illustrate other emobdiments of the invention wherein the phase relationship between gating pulses generated by a pulse generator 150 and the alternating current of source 122 is adjusted in accordance with motor speed.

The pulse generating portions, 150, of the circuits illustrated in FIGS. 2 and 3 are disclosed and claimed in patent application Serial No. 58,474, filed by Edward H. Dinger on September 26, 1960, and assigned to the General Electric Company, assignee of the instant application. To facilitate cross reference between the present disclosure and that appearing in the aforecited patent application, circuit components in the instant disclosure which are similar to those in the cited application are designated by underlined numerals that are identical to those used in the prior application. The reactor is directed to the cited application for a detailed description of the operation of these pulse generating circuits; however, those functions required for a complete understanding of the instant invention will be discussed in connection with operation hereinafter described.

The pulse generator 150, illustrated in FIG. 2, is generally similar to that illustrated in FIG. 3 of the aforecited patent application. Pulse generator 150 in FIG. 2 has been modified slightly by use of rectifying bridges 164 and 176 to obtain direct current sources, and also use of a different firing circuit for triggering transistor 10 into conduction, but these modifications do not affect the general operation of the circuit.

The speed control circuit of FIG. 2 generally functions in the manner previously described in connection with FIG. 1, with the distinction of a different means for enabling controlled rectifier 131 in accordance with motor speed. The motor is again energized with an unfiltered full-wave rectified voltage directly across shunt field 121 and directly across a series circuit comprising controlled rectifier 131, armature 120, and series resistor 135.

Motor speed is represented by the sum of voltages proportional to the armature terminal voltage and armature-resistance voltage drop as previously described, and this sum appears between points 145 and 146. The voltage between points 145 and 146 is compared with a standard voltage developed by a resistor 148 in series with shunt field winding 121 and a control signal is developed between conductor 151 and point 145 which represents the deviation between actual and desired speeds. The developed control signal is a direct current and is used to effect the firing circuit for transistor 10 to cause triggering thereof either earlier or later in any half cycle period in order to speed-up or slow-down the motor, respectively.

During each half cycle of alternating current from source 122, transistor 10 is triggered into conduction by a saw-tooth signal developed across capacitor 159 and applied to the base thereof through rectifier 166. In response to the alternating current supplied by source 122, primary T2—1 of input transformer T2 induces alternating voltages in secondary windings T2—2 and T2—3. The induced alternating voltages are applied to full-wave rectifying bridges 164 and 176, respectively, producing pulsating direct current at the outputs thereof. The direct current developed across rectifying bridge 164 is filtered by rectifier 163, resistor 160, and capacitor 162, and is applied via resistor 161 to capacitor 159. The voltage applied to capacitor 159 through resistor 161 charges it until the upper plate becomes more positive than the cathode of rectifier 158 which is connected to the positive terminal of full-wave rectifier 164. Resistor 161 and capacitor 159 are selected so that this event occurs near the end of each positive half cycle at which time the cathode of rectifier 158 is decreasing rapidly in voltage to zero. Capacitor 159 follows the output of the full-wave rectifier 164 to zero as a result of its connection through rectifier 158 to the low impedance bridge rectifier 164 and the bridge load resistance 165 connected in parallel with it. This occurs every half cycle of alternating current because the voltage appearing across full-wave rectifier 164 is unfiltered. A saw-tooth waveform is thus developed wherein the lower plate of capacitor 159 is negative with respect to the upper plate thereof. The actual voltage levels of the saw-tooth waveform are determined by the bias adjustment furnished by the direct current control voltage connected to the upper plate of capacitor 159 via resistor 155. The generated saw-tooth firing signal is coupled through isolating rectifier 166 to the base of transistor 10, and is effective to drive transistor 10 into conduction at a time determined by the magnitude of the control voltage.

As fully described in patent application Serial No. 58,474, once triggered by the described firing signal, transistor 10 generates a current pulse in primary winding 22 which induces a gating pulse in secondary winding 26 to initiate conduction in controlled rectifier 131. The pulse generator illustrated herein differs from that of the cited patent application by the use of secondary winding T2—3 and rectifier 176 to supply the operating direct current for transistor 10. Elements, including capacitor 175 and resistor 174, have been added to furnish the filtering needed to facilitate this modification. Further, it will be noted that in FIG. 2 primary winding 22 of the saturating transformer is reset after transistor 10 has stopped conducting by means of a reset circuit path comprising the upper terminal of rectifier 176, resistors 70 and 72, the primary winding 22, resistors 168 and 174, and the lower terminal of rectifier 176.

Once transistor 10 is rendered conducting by the firing signal, it provides a low impedance discharge path for capacitor 76. When the voltage on capacitor 76 discharges sufficiently, the forward voltage between the anode and cathode of transistor 10 is no longer present and the transistor stops conducting. If the firing signal applied through rectifier 166 remains below the triggering potential, when capacitor 76 recharges in the circuit comprising full-wave rectifier 176, and resistors 70, 69, and 174, it will again drive transistor 10 into conduction. Thus, a series of gating pulses is delivered to controlled rectifier 131, the instant of occurrence of the first of said pulses being determined by the speed of the motor, as reflected by the magnitude of the control voltage.

FIG. 3 illustrates another embodiment of the invention. The circuit schematically shown therein is similar to that considered in FIG. 2, differing only with respect to the details of pulse generator 150. In FIG. 3 the pulse generator 150 is identical to that shown as FIG. 5 of aforecited patent application Serial No. 58,474. As fully described in the cited patent application, transistor 10 is triggered into conduction by a saw-tooth wave developed across capacitor 108 at an instant of time discretely determined by the control signal appearing between conductors 151 and 160. Each time transistor 10 conducts, the resulting current flow through primary winding 22 induces a gating pulse in secondary winding 26 which gates controlled rectifier 131 into conduction. It should be noted that in FIG. 3, the direct current power for supplying pulse generator 150 is furnished via transformer T3 which has primary winding T3—1 directly connected to alternating current source 122 and secondary winding T3—2 (95, in patent application No. 58,474) connected to conductor 14 and junction 97 in a full-wave rectifying arrangement.

Each of the above-described circuits embodies the invention wherein a direct current motor driven by an unfiltered full-wave rectified alternating current source is afforded fast acting and accurate speed regulation. By employing a controlled rectifier exhibiting extremely short cut-off time and means for using the inductive effect of the motor's field winding, the invention permits development of a speed control circuit with a single controlled rectifier operating at almost a 100 percent duty cycle.

While there have been shown particular embodiments of this invention it will, of course, be understood that it is not wished to be limited thereto since modifications may be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. In a circuit for controlling a direct current motor, a source of unidirectional voltage periodically having a substantially zero magnitude connected to the field and armature of said motor, normally nonconducting switching means serially connected between said source and said armature, means selectively operative following the increase of said unidirectional voltage above said zero magnitude to render said switching means conductive in accordance with the deviation between the present motor speed and a selected motor speed, and means including said motor field for rendering said switching means nonconductive when said unidirectional voltage has said substantially zero magnitude.

2. In a circuit for controlling a direct current motor, a source of unidirectional voltage periodically having a substantially zero magnitude connected to the field and armature of said motor, controlled unidirectional current conducting means responsive to pulses to switch from a nonconducting to a conducting state serially connected between said source and said armature, means operative in response to the speed of said motor to generate a control signal discretely representative of the deviation of said speed from a selected speed, pulse generating means controlled by said control signal and selectively operative following increase of said unidirectional voltage above said zero magnitude to render said unidirectional current conducting means conducting by application of a pulse thereto, and means including said motor field operative when said unidirectional voltage has a substantially zero magnitude to render said controlled unidirectional current conducting means nonconductive.

3. A circuit for controlling a direct current motor from a source of alternating current comprising rectifying means supplied by said alternating current source and delivering full-wave rectified voltage to the field of said motor, normally nonconducting switching means interconnecting the armature of said motor and said rectifying means, said normally nonconducting switching means being responsive to a direct current pulse to assume a conduction state, means operative in response to the speed of said motor to generate a control signal discretely representative of the deviation of said speed from a selected speed, pulse generating means controlled by said control signal for producing pulses positioned in time in accordance with the magnitude of said control signal, means for applying said time-positioned pulses to said switching means to render it conductive, and means operative when said full-wave rectified voltage approaches zero to render said switching means nonconducting.

4. A circuit as defined in claim 3 wherein said pulse generating means comprises a magnetic amplifier responsive to said control signal to produce pulses time-positioned from the initiation of each half cycle of said alternating current in accordance with the magnitude of said control signal, and a transformer supplied by said produced pulses having secondary windings connected to provide direct current pulses to switch said switching means into conduction.

5. A circuit as defined in claim 3 wherein said pulse generating means comprises a switching means rendered conductive at an instant of time selectively determined by the magnitude of said control voltage, and a saturable transformer supplied by said switching means when conducting having its secondary connected to apply a gating impulse to said unidirectional current conducting means when said switching means is rendered conductive.

6. A circuit for controlling a direct current motor from an alternating current source comprising rectifying means supplied by said alternating current source and delivering full-wave rectified voltage to the field of said motor, controlled unidirectional current conducting means responsive to direct current pulses to switch from a nonconducting to a conducting state serially connected with the armature of said motor across said rectifying means, means for generating a voltage proportional to the voltage across said armature minus the armature voltage drop therein, means for comparing generated voltage with a reference potential and developing a control voltage having a magnitude proportional to the deviation between the actual speed of said motor and a selected speed, pulse generating means controlled by said control voltage for producing pulses positioned in time in accordance with the magnitude of said control voltage, means for applying said time-positioned pulses to said controlled unidirectional current conducting means to render it conducting, and means including said motor field for reverse-biasing said unidirectional current conducting means when the voltage across said rectifying means approaches zero.

7. A circuit for controlling a direct current motor from an alternating current source comprising a full-wave rectifier supplied by said alternating current source and delivering unfiltered voltage to the field of said motor, controlled unidirectional current conducting means interconnected between said full-wave rectifier and the armature of said motor, means controlled by the speed of said motor to generate a direct current voltage proportional thereto, means including a reference voltage and responsive to said generated direct current voltage for developing a control signal the magnitude of which is proportional to the deviation between present motor speed and desired motor speed, pulse generating means operative in response to said control signal to generate a gating pulse that is time-positioned in accordance with the magnitude of said control voltage, means for applying said time-positioned pulse to switch said controlled unidirectional current conducting means into conduction, unidirectional current conducting means connected between the cathode of said controlled unidirectional current conducting means and the negative terminal of said full-wave rectifying means oriented to be normally non-conducting, said unidirectional current conducting means providing a clamp for the cathode of said controlled unidirectional current conducting means during the period when the voltage across the full-wave rectifier approaches zero and the current through said field creates a relatively negative potential difference between the anode and cathode of said controlled unidirectional current conducting means.

8. A circuit as defined in claim 7 wherein said pulse generating means comprises a magnetic amplifier responsive to said control signal to produce pulses time-positioned from the initiation of each half cycle of said alternating current in accordance with the magnitude of said control signal, and a transformer supplied by said produced pulses having secondary windings connected to provide direct current pulses to switch said switching means into conduction.

9. A circuit as defined in claim 7 wherein said pulse generating means comprises a switching means rendered conductive at an instant of time selectively determined by the magnitnude of said control voltage, and a saturable transformer supplied by said switching means when conducting having its secondary connected to apply a gating impulse to said unidirectional current conducting means when said switching means is rendered conductive.

No references cited.

UNITED STATES PATENT OFFICE
CERTIFICATE OF CORRECTION

Patent No. 3,064,174                           November 13, 1962

Edward H. Dinger

It is hereby certified that error appears in the above numbered patent requiring correction and that the said Letters Patent should read as corrected below.

Column 4, line 39, for "149" read -- 140 --; column 8, line 62, after "comparing" insert -- said --; column 10, line 18, for "magnitnude" read -- magnitude --.

Signed and sealed this 30th day of April 1963.

(SEAL)
Attest:

ERNEST W. SWIDER
Attesting Officer

DAVID L. LADD
Commissioner of Patents